Sept. 22, 1959   C. KIPP   2,905,412
FIXTURE FOR HANGING MIRRORS, PICTURES AND THE LIKE
Filed May 18, 1955   2 Sheets-Sheet 1
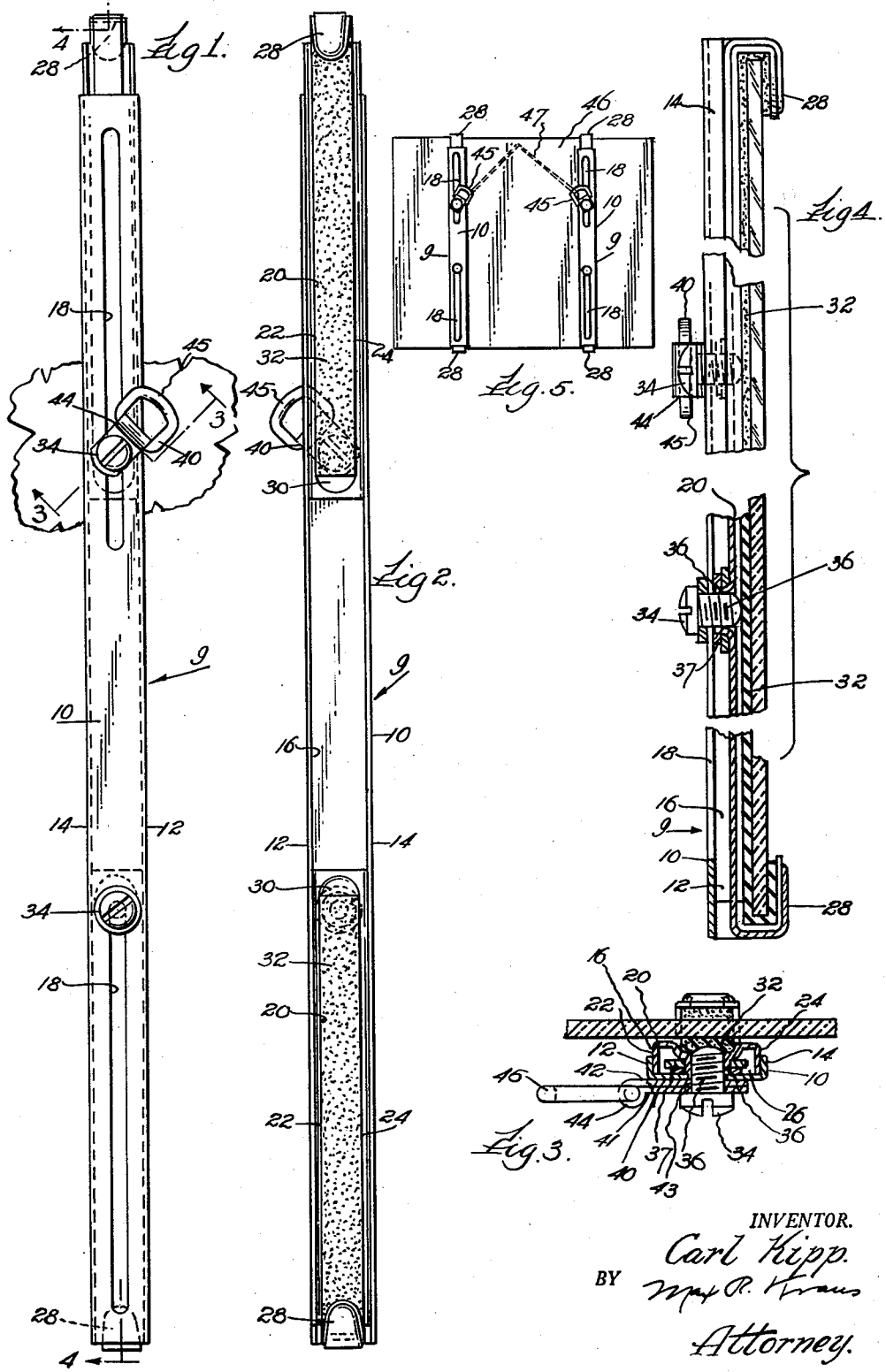
INVENTOR.
Carl Kipp.
BY
Attorney.

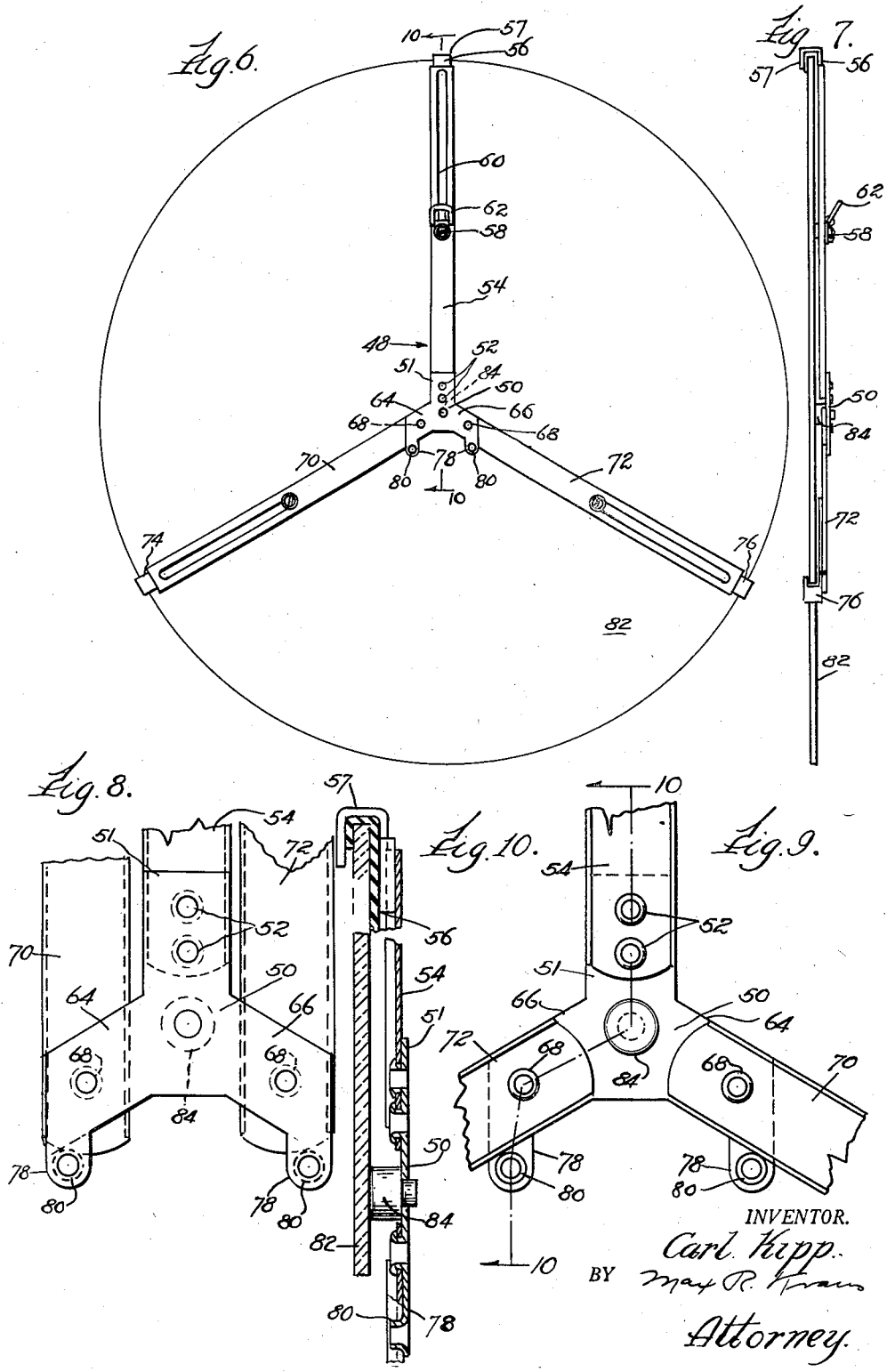

United States Patent Office

2,905,412
Patented Sept. 22, 1959

2,905,412

FIXTURE FOR HANGING MIRRORS, PICTURES AND THE LIKE

Carl Kipp, Chicago, Ill.

Application May 18, 1955, Serial No. 509,286

3 Claims. (Cl. 248—30)

This invention relates to a fixture for hanging mirrors, pictures and the like, particularly of the frameless and backless type.

Mirrors or the like which have no frame or supporting backs are hard to hang for the reason that the screws or hangers cannot be imbedded or secured directly to the mirror. One of the objects of this invention is to provide a fixture which may be secured to a mirror, without permanent attachment means and without defacing the mirror, and which is adjustable to accommodate different mirror sizes.

Another object is to provide a fixture for mirror hanging which may be readily secured to a mirror of any size and shape and which is inexpensive to manufacture and easy and quick to install.

Other objects will become apparent as this description progresses.

In the drawings:

Figure 1 is an elevational view taken from the rear of the fixture.

Fig. 2 is an elevational view taken from the front of the fixture.

Fig. 3 is an enlarged cross sectional view taken on line 3—3 of Fig. 1.

Fig. 4 is a detail section broken away on line 4—4 of Fig. 1.

Fig. 5 is a view showing the fixture secured to a mirror.

Fig. 6 is a rear view of a modified fixture secured to the rear of a round mirror.

Fig. 7 is an elevational side view taken on lines 7—7 of Fig. 6.

Fig. 8 is an enlarged rear view of the connecting plate.

Fig. 9 is a view taken on the opposite side of Fig. 8, and

Fig. 10 is an enlarged cross sectional view, broken away, taken on lines 10—10 of Fig. 6.

The fixture generally indicated at 9 comprises a straight bar 10 made of metal having inwardly turned upper and lower marginal flanges 12 and 14 extending the length of the bar to provide a longitudinal channel or slideway 16. The bar 10 is provided with a pair of spaced longitudinal slots 18, one adjacent each of the ends of the bar. Mounted to telescopically slide within said bar are a pair of slidable or extendible arms 20 of identical construction. The slidable arms 20 are likewise formed of channel bars having upper and lower marginal flanges 22 and 24. The slidable arms 20 are positioned in the slideway 16 in opposed relation to the bar 10 and forwardly thereof so that a space 26 is provided between the vertical walls of the arms 20 and bar 10 with the marginal flanges 22 and 24 riding within the marginal flanges 12 and 14 of the bar 10.

Formed integrally at the ends of the slidable arms 20 are substantially U-shaped ears or hooks 28 which are turned outwardly and forwardly of the arms and which are adapted to engage the marginal edges of the mirror; that is the front, rear and sides of the mirror. The arms 20 and hooks 28 are provided with a longitudinal recessed portion 30 which receive and to which is secured as by glue or otherwise a felting or rubber material 32 which is in contact with the back and marginal edges of the mirror to prevent scratching thereof. A pair of spaced screw bolts 34 extend through the slots 18 of the bar 10 and are threadedly secured in threaded necks 36 formed on each of the slidable arms 20. The ends of the screw bolts 34 abut against the rubber material 32. Suitably washers 37 are positioned around the threaded neck 36 and bolt 34, and a washer 38 is positioned between the head of the bolt and the bar 10. The screws 34 slide and move with the arms 20 and when tightened maintain the arms in any adjusted position relative to the bar 10.

Secured preferably to one of said screw bolts 34 is a hanger generally designated at 40. The hanger 40 may be formed of a sheet metal material reversely bent to form two adjacent sides 41 and 42 provided with an opening 43 through which the screw bolt 34 passes. The looped portion 44 receives the hooking member 45. As will be seen, the hanger 40 slides with the adjustable arms 20, but is rotatable relative thereto.

The hooking member 45 may be directly secured to suitable fastening elements on a wall or other supporting surface or may be secured to a flexible suspension cord.

As is seen in Fig. 5, two fixtures 9 are vertically and spacedly secured directly to the back of a mirror 46 with the respective ears or hooks 23 of the fixtures engaging the top and bottom marginal edges of the mirror. A flexible cord 47 is secured to the two hooking members 45 and the cord is centrally secured to a fastening element on the wall.

If a backing member for the mirror is desired, it may be positioned adjacent the rear of the mirror and the fixture 9 will hold the mirror and backing member together and yet serve as a means for hanging the mirror. Thus with the present invention no screws or other means are needed, and conventional backing members may be eliminated. The arms 20 which telescope in the bar 10 may be adjusted relative to the bar to accommodate any size mirror. While the invention is described specifically in connection with a mirror it will be understood that it may be used for hanging pictures and other objects and that wherever the term mirror is used it shall likewise be applicable to similar other objects.

Figs. 6 to 10 inclusive, show a modified form of fixture which may be used to hold a round or oval shaped mirror or the like and said fixture is designated generally by the numeral 48. In extended position, as shown in Fig. 6, the fixture is substantially the shape of an inverted Y.

It comprises a central inverted Y-shaped plate 50. To the leg 51 thereof is fixedly secured as by rivets 52 one of the bars 54 of the fixture. The bar 54 is channel shaped and is constructed similar to bar 10 and receives a slidable arm 56 which is identical to the slidable arms 20. The slidable arm 56 has an ear or hook 57 like hook 28 for engaging the peripheral edge of the mirror. A screw bolt 58 passes through the slot 60 in the bar 54 and is secured in the same manner as the screw bolt 34 previously described and same also supports a hanger member 62 similar to the hanger 40 heretofore described.

The oppositely directed arms 64 and 66 of the plate 50 have each pivotally secured thereto by suitable fastening means 68 bars 70 and 72 which are of the some construction as the bar 54 and which also slidably receive arms 74 and 76 similar to arm 56 with similar hook members on the ends thereof. The bars 70 and 72 however do not support a hanger member like hanger member 62.

The arms 64 and 66 of the plate 50 each have a downwardly extending portion 78 each of which has an inwardly punched eyelet 80 which engages the bars 70 and 72 to limit their downward movement. The bars 70 and 72 may be swung or pivoted upwardly from the position shown in Fig. 6 to be positioned adjacent the bar 54, but are prevented by the depressed eyelet 80 from swinging below the eyelets. The fixture 48 may be readily collapsed and when extended as shown in Fig. 6 may be attached to a round or oval shaped mirror 82 for supporting same with the hook members of the slidable arms embracing the peripheral edge of the mirror similar to fixture 9.

The plate 50 has suitably secured to it a rubber spacing disc 84 the top of which is on the same plane as the rubber surface on the slidable arms 56, 74 and 76 so that the rear of the mirror is uniformly spaced and supported with respect to the fixture.

It will be understood that various changes and modifications may be made from the foregoing without department from the spirit and scope of the appended claims.

I claim:

1. In a fixture for supporting mirrors and the like, comprising a straight rear channel bar open at its opposite ends and having a longitudinal slotted portion adjacent each of the ends thereof, a pair of slidable arms received in said channel bar and positioned forwardly of said rear channel bar, each said arm being of a substantial length and slidable through its respective opposite open end of the channel bar and adapted to slide in opposite directions to extend said arms in opposite directions away from each other in a straight line with said channel bar and extend same a substantial distance from the opposite ends of the channel bar, each said arm having a threaded opening, a threaded member engaging each said threaded opening and cooperating with each slotted portion in said channel bar for separately and adjustably locking said arms relative to said channel bar anywhere along the length of said slotted portions, a resilient backing member secured to the face of said arms and covering the opposite end of said threaded opening, and said arms each having a hook adjacent the outer end thereof to engage the opposite ends of a mirror or the like, means secured to at least one of said slidable arms and movable with said arm for supporting said fixture and mirror in a suspended position.

2. In a fixture for supporting mirrors and the like, comprising a straight rear channel bar open at its opposite ends and having a longitudinal slotted portion adjacent each of the ends thereof, a pair of slidable arms received in said channel bar and positioned forwardly of said rear channel bar, each arm being of a substantial length and slidable through its respective opposite open end of the channel bar and adapted to slide in opposite directions to extend said arms in opposite directions away from each other in a straight line with said channel bar and extend same a substantial distance from the opposite ends of the channel bar, each said arm having a threaded opening, a threaded member engaging each said threaded opening and cooperating with each slotted portion in said channel bar for separately and adjustably locking said arms relative to said channel bar anywhere along the length of said slotted portions, a resilient backing member secured to the face of said arms and covering the opposite end of said threaded opening, said arms each having a hook adjacent the outer end thereof to engage the opposite ends of a mirror or the like, and a hinge member connected to at least one of said threaded members and movable with one of said arms and adapted for securement to a supporting surface.

3. In a fixture for supporting mirrors and the like, comprising a straight rear channel bar open at its opposite ends, said channel bar having an intermediate wall and parallel extending flanges, said intermediate wall having a longitudinal slotted portion adjacent each of the ends thereof, a pair of channel shaped arms each having an intermediate wall and parallel extending flanges, said arms being reversely positioned with respect to said channel bar so that the flanges of the arms engage the flanges of the channel bar but the walls of each are spaced from each other to provide a space therebetween, said arms being slidably received in said channel bar and positioned forwardly of said rear channel bar with each arm slidable through its respective opposite open end of the channel bar and adapted to slide in opposite directions to extend said arms in opposite directions away from each other in a straight line with said channel bar, a threaded opening in the intermediate wall of each of the arms, a screw member secured to the threaded opening of each slideable arm and extending through said slotted portions for separately and adjustably locking said arms relative to said channel bar anywhere along the length of said slotted portions, a resilient backing member secured to the face of said arms and covering the opposite end of said threaded opening, and said arms each having a hook adjacent the outer end thereof to engage the opposite ends of a mirror or the like, and means secured to at least one of said arms and movable with said arm and rotatable with respect thereto for supporting said fixture and mirror in a suspended position.

References Cited in the file of this patent

UNITED STATES PATENTS

| | | |
|---|---|---|
| 498,902 | Lynch | June 6, 1893 |
| 928,132 | Kaufman | July 13, 1909 |
| 1,382,908 | Helka | June 28, 1921 |
| 1,791,006 | Shorr | Feb. 3, 1931 |
| 2,577,526 | Kelly | Dec. 4, 1951 |
| 2,632,971 | Manczek et al. | Mar. 31, 1953 |
| 2,681,194 | Halvorsen | June 15, 1954 |
| 2,696,962 | Goss | Dec. 14, 1954 |